United States Patent [19]

Moro

[11] Patent Number: 5,683,598
[45] Date of Patent: Nov. 4, 1997

[54] TERMINAL UNIT FOR RESISTANCE WELDING OR LASER BEAM PROCESSING, CONTROL APPARATUS FOR RESISTANCE WELDING OR LASER BEAM PROCESSING, AND METHOD FOR OPERATING TERMINAL UNIT

[75] Inventor: Kyohji Moro, Chiba-ken, Japan

[73] Assignee: Miyachi Technos Corporation, Chiba-ken, Japan

[21] Appl. No.: 631,023

[22] Filed: Apr. 12, 1996

[30] Foreign Application Priority Data

Apr. 13, 1995 [JP] Japan ................. 7-112389

[51] Int. Cl.⁶ ................................................. B23K 11/24
[52] U.S. Cl. ............................. 219/108; 219/121.61
[58] Field of Search ................................ 219/108, 109, 219/110, 121.61, 121.62, 121.63; 364/474.08

[56] References Cited

U.S. PATENT DOCUMENTS

| | | | |
|---|---|---|---|
| 4,628,176 | 12/1986 | Kojima et al. | 219/110 |
| 4,717,805 | 1/1988 | Miyagawa | 219/108 |
| 4,937,419 | 6/1990 | Kolodziej et al. | 219/110 |
| 4,945,201 | 7/1990 | Ito et al. | 219/110 |
| 4,973,814 | 11/1990 | Kojima et al. | 219/108 |
| 5,067,086 | 11/1991 | Yamazaki et al. | 364/474.08 |
| 5,166,491 | 11/1992 | Izume et al. | 219/110 |
| 5,239,159 | 8/1993 | Masuda | 364/474.08 |

*Primary Examiner*—Clifford C. Shaw
*Attorney, Agent, or Firm*—Wenderoth, Lind & Ponack

[57] ABSTRACT

A single terminal unit is provided to automatically adapt to various types of control apparatus for controlling resistance welding or laser beam processing by merely connecting the terminal unit to the control apparatus via a communication interface. In an initialization mode, a CPU in the programing unit verifies a machine ID registered therein with the machine ID of the control apparatus currently connected to the programming unit via the communication interface (C1–C8). If not matched, the CPU requests the control apparatus to send an application program (C4). In response to the request, a CPU in the control apparatus reads, from ROM, the stored application program and transmits (downloads) it to the CPU in the programming unit. The CPU in the programming unit receives the application program from the control apparatus and writes it into a program read/write memory (C5). It also writes the machine ID of the control apparatus, as newly registered machine ID, into the memory at a predetermined location. Thereafter, the CPU in the programming unit operates according to the application program downloaded in the program read/write memory.

8 Claims, 13 Drawing Sheets

FIG. 10

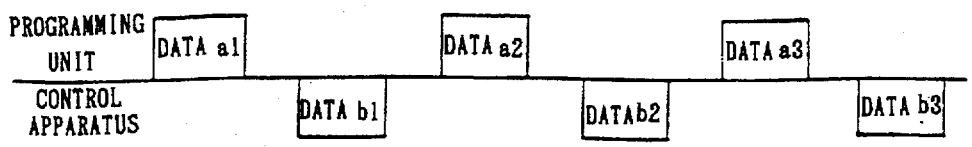

FIG. 11

(1) DATA a1 : ? ? I D  ···· REQUEST TO SEND MACHINE ID (2) DATA b1 :           ···· MACHINE ID RESPONSE (3) DATA a2 : ? ? O P  ···· REQUEST TO SEND APPLICATION PROGRAM (4) DATA b2 :  $\underline{M_{00}}$ [ $\underline{0}$ , $\underline{01}$ , $\underline{\text{"–SCHEDULE ="}}$ $\underline{NUL}$ ,
              ①    ②   ③         ④              ⑤

$\underline{2}$ , $\underline{7}$ , $\underline{\text{"SQZ"}}$ , ----, $\underline{2}$ , $\underline{29}$ $\underline{\text{"OFF"}}$ $\underline{NUL}$ ···
              ②   ③    ④              ②    ③    ④      ⑤

(5) DATA a3 : ? ? Q S  ···· REQUEST TO SEND SETUP DATA (6) DATA b3 :  ···· 15, 35, 02, 02, ----

FIG. 12

|   | 0 | 1 | 2 | 3 | 4 | 5 | 6 | 7 | 8 | 9 | 10 |
|---|---|---|---|---|---|---|---|---|---|---|----|
| 0 |   | – | S | C | H | E | D | U | L | E | =  |
| 1 |   |   |   |   |   |   |   |   |   |   |    |
| 2 |   |   |   |   |   |   |   | S | Q | Z |    |
|   |   |   |   |   |   |   |   |   |   |   |    |

```
-SCH. #15    TIME  VOLT      ENERGY    WATER 28°C
 FLASH1    20.0ms  A     HIGH   999.9J
 COOL1     20.0ms        LOW    000.0J    AVERAGE
 FLASH2    20.0ms  B     MON.     0.0J     50.0W
 COOL2     20.0ms        TOTAL COUNT  12345678
 FLASH3    20.0ms  A     GOOD  COUNT  00000000
  A=500V  B=500V   200pps  9999shot  DMY=999
 HV:OFF   MAIN SHUTTER:OFF   POSITION:OFF
```

TERMINAL UNIT FOR RESISTANCE WELDING OR LASER BEAM PROCESSING, CONTROL APPARATUS FOR RESISTANCE WELDING OR LASER BEAM PROCESSING, AND METHOD FOR OPERATING TERMINAL UNIT

BACKGROUND OF THE INVENTION

The present invention relates to a terminal unit such as a programming unit connectable to control apparatus for controlling resistance welding or control apparatus for control line laser beam processing via a communication interface.

As shown in FIG. 17, a prior art programming unit 200 is typically portable and connected via a communication cable 204 to a stationary control apparatus such as the one for controlling resistance welding 202. The programming unit 200 performs bidirectional data communication with the control apparatus 202 according to a predetermined communication protocol. A liquid crystal display panel 206 and input keys 208 to 216 are disposed on a front panel of the programing unit 200.

FIG. 18 is an enlarged view of the front panel of the programming unit 200. Operation for setting welding conditions of each schedule is done as follows. First, an operator calls a "schedule" screen (shown in FIG. 18) on the liquid crystal display panel 206 by means of predetermined key operations. The schedule screen includes items of welding conditions such as "SCHEDULE" (schedule No.), "SQUEEZE" (squeeze time), "WELD" (weld time), "HOLD" (hold time) and "CURR" (welding current).

Then, the operator depresses cursor keys 208 (208a–208d) to move the screen cursor to the value display position of "SCHEDULE" and depresses an increment key 210 or decrement key 212. Each depressing of the increment key 210 increments the value at the screen cursor one by one whereas each depressing of the decrement key 212 decrements the value one by one. When the displayed value has reached the desired one, say, "01", the operator depresses a write key 214 to thereby select the schedule No. "01."

Next, the operator depresses the cursor keys 208 (208a–208d) to move the screen cursor to the value display position of "SQUEEZE", depresses the increment key 210 or decrement key 212 to reach the desired value of, say, "12" (cycles) and then depresses the write key 214. Thus, the squeeze time for the schedule No. "01" has been set to "12" (cycles). Repeating key operations in a similar manner, the items of "WELD", "HOLD" and "CURR" will be set to "10" (cycles), "15" (cycles) and "12.3" (KA), respectively.

When it has received a selected value of an item or welding condition in the manner as described, the programming unit 200 transmits the selected value or corresponding data to the resistance welding control apparatus 202 via the communication cable 204 so that the control apparatus 202 updates the value of the corresponding item in memory to the transmitted value.

A menu key 216 is used to call a menu screen (not shown) on the liquid crystal display panel 206. Depressing the menu key 216, the menu screen is presented on the panel 206. The menu screen includes the item "SCHEDULE." The operator moves the screen cursor to the item "SCHEDULE" by operating cursors keys 208. Then depressing the write key 214 will change the visual presentation on the panel 206 from the menu screen to the schedule screen shown in FIG. 18.

As described above, the programming unit 200 is so arranged as to input selected values of welding conditions to the resistance welding control apparatus 202 connected via the communication cable 204.

In the prior art, updating a version of the resistance welding control apparatus 202 to one having additional items of welding conditions or additional functions necessarily accompanies the updated version of the programming unit 200 to the one with modified software installed therein to handle the additional items or functions although no change of the hardware of the programming unit is required. In many cases, programming units having different software from one another but having the same hardware are used as terminal units for a plurality of different versions or types of resistance welding control apparatus and laser beam processing control apparatus for controlling laser beams welding or machining.

Thus in the prior art, dedicated programming units 200(1) to 200(n) having the same hardware but different software from one another are respectively used for corresponding one of a plurality of different types of control apparatus 202(1) to 202(n) for controlling resistance welding or laser beam processing, as shown in FIG. 19.

Therefore, in a factory or work site equipped with various types of control apparatus, there must be provided a number of programming units corresponding to the number of the control apparatus, thus increasing the cost of production facility. Further, since a programming unit 200(i) can be detachably connected to any control apparatus 200(i) via communication cable 204, an operator must check each connection to see whether the programming unit has been connected to an appropriate control apparatus.

In an attempt to avoid the problems, one might propose an arrangement shown in FIG. 20. In FIG. 20, there are provided a plurality of IC cards, ROM cards or boards RC(1) to RC(n) each storing a program which is dedicated to a corresponding one of the control apparatus 202(1) to 202(n) and is to be used by a single programming unit 200. For each control apparatus 202(i), a corresponding ROM card RC(i) is selected and loaded into the programming unit 200. Thus all the control apparatus 202(1) to 202(n) share the single programming unit 200.

However, in the actual work site or processing place, managing and handling a large number of ROM cards is troublesome since a proper one must be selected when required. Further, a wrong ROM card can be loaded into the programming unit (meaning that a wrong programming unit is connected to control apparatus 202(i)) with a chance no less than the chance of a wrong connection in the case where dedicated programming units are employed (FIG. 19).

SUMMARY OF THE INVENTION

With the above problems in mind, an object of the present invention is to provide a versatile terminal unit for resistance welding or laser beam processing which is shared by and operable with various types of control apparatus for controlling resistance welding or laser beam processing by merely establishing connection therebetween via a communication interface. A further object is to provide a method for operating such a terminal unit.

A further object of the invention is to provide a control apparatus for controlling resistance welding or laser beam processing capable of providing the shared and versatile feature to the terminal unit of the present invention.

To achieve the objects, the present invention provides a method for operating a terminal unit connectable via a communication interface to a control apparatus for controlling resistance welding or a control apparatus for controlling laser beam processing in such a manner that the terminal unit provides an input function of inputting selected values of welding or processing conditions to the control apparatus and/or a display function of receiving measured or monitored values from the control apparatus and displaying the received value.

The method includes providing the control apparatus with a stored application program which is dedicated to the control apparatus and is to be used by the terminal unit.

The application program is sent from the control apparatus to the terminal unit in an initialization mode when the terminal unit is connected to the control apparatus via the communication interface to thereby adapt the terminal unit so as to perform the input function and/or the display function according to the application program.

A terminal unit of the invention includes a display means for displaying characters and/or graphics representative of the welding or processing conditions;

Key means is provided for inputting the selected values of the welding or processing conditions;

A selected value read/write memory means is provided for storing the selected values of the conditions;

A receiving means is provided for receiving the application program which is dedicated to the control apparatus and is to be used by the terminal unit from the control apparatus via the communication interface;

A program read/write memory means is provided for storing the application program received by the receiving means.

Also, a processing means is provided for executing required processing according to the application program stored in the program read/write memory means.

A control apparatus of the present invention for controlling resistance welding includes a selected value read/write memory means for storing the selected values of the welding conditions.

A program storage means is provided for storing the application program.

A transmitting means is provided for transmitting the application program stored in the program storage means to the terminal unit via the communication interface.

Also, a control means is provided for controlling resistance welding according to the selected values of the welding conditions stored in the selected value read/write memory means.

A control apparatus of the invention for controlling laser beam processing includes a selected value read/write memory means for storing the selected values of the processing includes a program storage means for storing the application program;

transmitting means for transmitting the application program stored in the program storage means to the terminal unit via the communication interface; and Also, a control means is provided for controlling laser beam processing according to the selected values of the welding conditions stored in the selected value read/write memory means.

In accordance with the present invention, a control apparatus for controlling resistance welding or laser beam processing includes a program storage means that has stored therein an application program. The application program is dedicated to the control apparatus and is to be used by a terminal unit, thus serving to adapt the terminal unit to the control apparatus. When the terminal unit is connected to the control apparatus via a communication interface, the control apparatus transmits the application program to the terminal unit in an initialization mode. The terminal unit writes the application program into a program read/write memory means therein. A processing means in the terminal unit operates according to the application program to thereby perform functions required for the control apparatus, such as an input function of inputting selected values of welding conditions to the control apparatus.

BRIEF DESCRIPTION OF THE DRAWINGS

The above and other objects and advantages of the invention will become more apparent from the following description taken in conjunction with the drawings in which:

FIG. 10 is a diagram of a sequence of data transmission performed in the initialization mode between the programming unit and the control apparatus in accordance with the present invention;

FIG. 11 shows contents and meaning of the data transmitted in the initialization mode;

FIG. 12 is a view of a screen displayed on the programming unit;

DETAILED DESCRIPTION OF PREFERRED EMBODIMENTS

Embodiments of the present invention will be described with reference to FIGS. 1 to 16.

Figure 1:
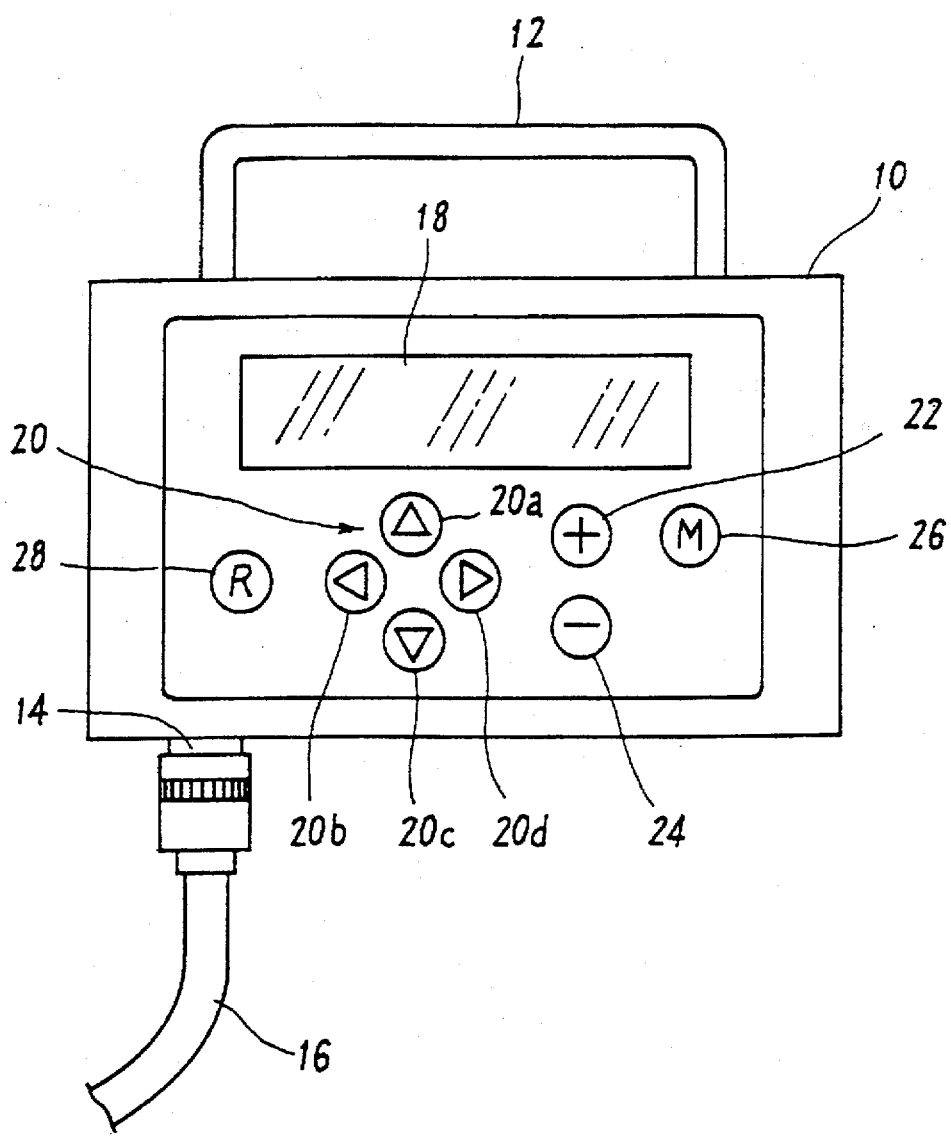
FIG. 1 is a front view of one embodiment of a programming unit for resistance welding in accordance with the present invention.

FIG. 1 is an external view of one embodiment of a resistance welding programming unit 10 in accordance with the invention.

The programming unit 10 is portable and has a handle 12 at top and a communication connector 14 at bottom. One end of a communication cable 16 is detachably connected to the communication connector 14. The other end of the communication cable 16 is detachably connected to a communication connector (not shown) of a resistance welding control apparatus.

A flat panel display, such as a liquid crystal display 18, is disposed above the center of the front panel of the programming unit 10. Disposed below the flat panel display 18 are keys 20 to 28. The keys include cursor keys (20a to 20d), increment key 22, decrement key 24, menu key 26 and trouble reset key 28.

Cursor keys 20 (20a to 20d) are used to move a screen cursor from one to another item on a display screen of the display 18. Upon depressing of each key 20a–20d, the screen cursor is moved in the direction of the arrow indicated on the key.

The increment and decrement keys 22 and 24 define a data input key means. A value of a selected item pointed to by the screen cursor is incremented one by one in response to each depressing of the increment key 22, or decremented one by one in response to each depressing of the decrement key 24.

The menu key 26 is used to call a menu screen (to be described). The trouble reset key 28 is used to release a trouble screen displayed at the occurrence of trouble.

Figure 2:
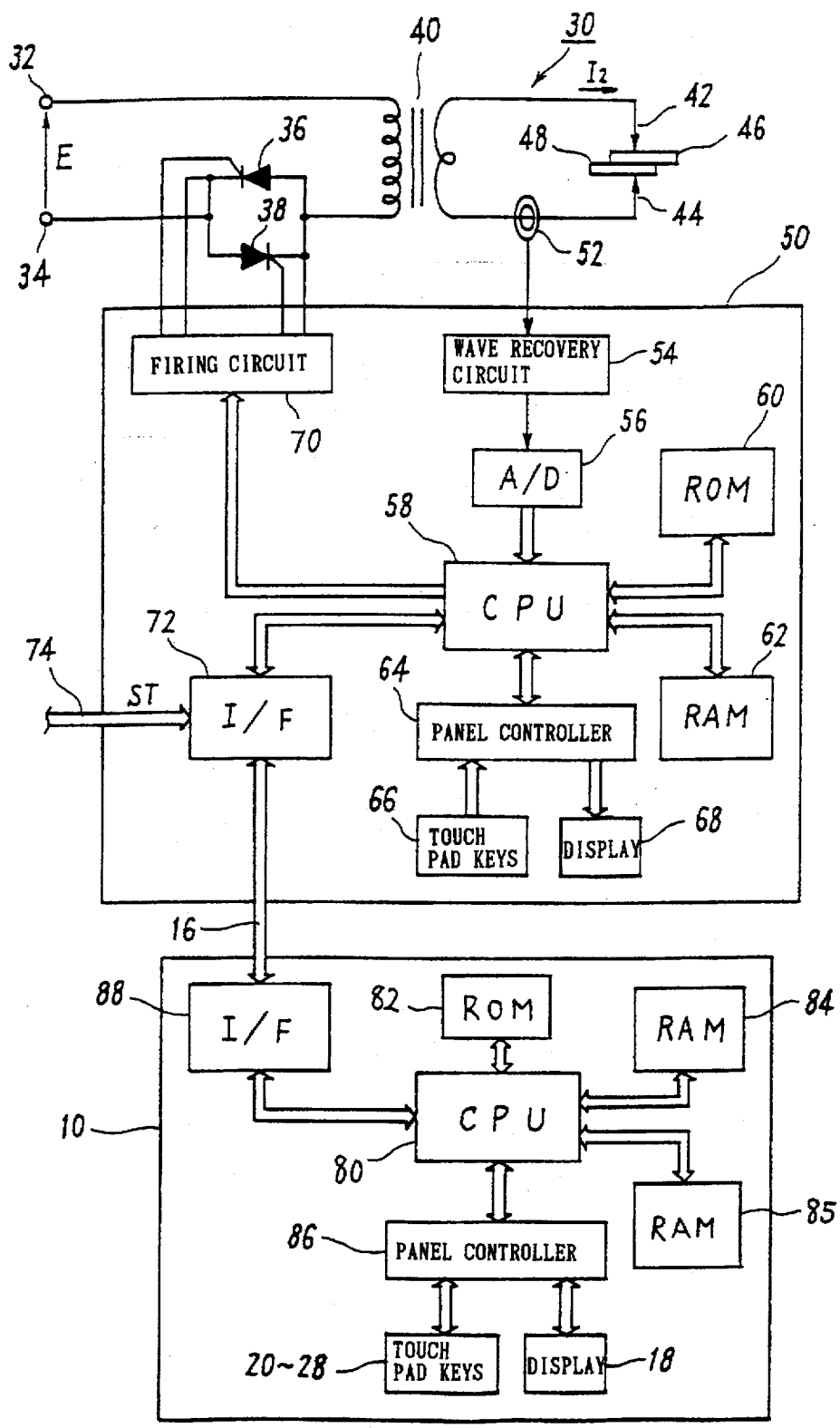
FIG. 2 is a block diagram of a resistance welding system incorporating the programming unit and a resistance welding control apparatus in accordance with the present invention.

FIG. 2 shows a resistance welding system of the embodiment. The resistance welding system comprises a resistance welding machine 30 that performs AC resistance welding, a resistance welding control apparatus 50 that controls resistance welding of the resistance welding machine 30 and the programming unit 10 that is placed at a remote site from the main control 50 and inputs selected values of welding conditions to the control apparatus 50.

In the resistance welding machine 30, a commercial AC supply voltage E is received by input terminals 32 and 34 and then supplied to the primary coil of a welding transformer 40 via a pair of thyristors 36 and 38 serving as a contactor. An AC induction electromotive force (secondary voltage) induced in the secondary coil of the welding transformer 40 is applied across workpieces 46 and 48 via secondary conductors and a pair of welding electrodes 42 and 44 so that an AC welding current $I_2$ may flow through the secondary circuit. Magnitude (effective value) of the welding current $I_2$ is controlled by controlling firing angle of the thyristors 36 and 38 which are controlled by a firing circuit 70 in the control apparatus 50.

The control apparatus 50 includes a current sensor e.g., troidal coil) 52, a wave recovery circuit 54 with an integrating circuit, an analog-to-digital converter 56, CPU 58, ROM 60, RAM 62, a panel controller 64, touch pad keys 66, a display 68, the firing circuit 70 and an interface circuit 72.

The combination of the troidal coil 52, wave recovery circuit 54, analog-to-digital converter 56, CPU 58 and firing circuit 70 constitutes a closed-loop constant-current control circuit. When welding current $I_2$ flows in the resistance welding machine 30, the troidal coil 52 outputs a voltage having a waveform derivative of the welding current $I_2$ waveform. The wave recovery circuit 54 which includes an integrator circuit outputs a voltage signal (welding current detection signal) representing the waveform of the welding current $I_2$. The welding current (detection) signal from the wave recovery circuit 54 is converted by the analog-to-digital converter 56 into a corresponding digital signal which is then input to CPU 58. CPU 58 compares the welding current (detection) signal (measured value) with the selected value thereof to compute the error therebetween. CPU 58 supplies a firing angle control signal to the firing circuit 70 in such a manner that the error will be cancelled. The firing circuit 70 turns on (fires) the thyristors 36 and 38 at a firing angle according to the firing angle control signal from CPU 58. With the closed-loop constant-current control, the welding current $I_2$ maintains near the selected value.

ROM 60 stores programs defining the internal operation of the control apparatus, such as a control program for the constant-current control stated above, a display program for a man-machine interface on the front panel and a program of a key input routine. ROM 60 further stores a communication control program for communicating data with the programming unit 10, and an application program to be used by the programming unit to adapt it to the control apparatus. ROM 60 further stores an identification code of the control apparatus 50, i.e., machine ID thereof.

According the program stored in ROM 60, CPU 58 executes necessary computations, controls respective components of the control apparatus 50 and communicates data with the programming unit 10.

RAM 62 stores selected values of welding conditions, measured values thereof, and intermediate and final computed data. Contents of RAM 62 are held by a backup battery. The panel controller 64 provides an interface between CPU 58, and keys 66 and display device 68 (including liquid crystal display or LED indicators) disposed on the front panel.

The interface circuit 72 is connected to CPU 58 via an internal bus and also connected to a communication interface circuit 88 in the programming unit 10 via the communication cable 16. Further, the interface circuit 72 is connected to an external welding robot or weld start switch (not shown) via a cable 74.

The cable 74 carries a weld start signal ST. This signal ST specifies a number of a desired welding schedule. Upon receipt of a weld start signal ST via the interface circuit 72, CPU 58 reads, from RAM 62, selected values of the welding conditions (e.g., squeeze time, weld time, welding current) for the welding schedule No. specified by the weld start signal ST. Then CPU 58 controls the resistance welding machine 30 to perform resistance welding according to the selected values of the welding conditions thus read out.

The interface circuit 72 provides a communication interface for data communication with the programming unit 10, such as modem interface function for RS-232C or RS-422 and includes a communication integrated circuit for transmitting and receiving, a driver/receiver, etc.

The programming unit 10 includes CPU 80, ROM 82, RAM 84, RAM 85, panel controller 88 and communication interface circuit 88.

The ROM 82 stores a system program for setting up the programming unit 10. The system program includes an initial communication control program for communicating data with the resistance welding control apparatus 50 in an initialization mode.

RAM 84 serves as a program memory for storing an application program. According to the application program, the programming unit 10 performs functions required for the resistance welding control apparatus 50, in particular the input function of inputting selected values of welding conditions to the control apparatus 50.

The application program includes a display program for providing a man-machine interface on the front panel and a program of a key input routine. As will be described, the control apparatus 50 sends or downloads the application program into RAM 84 of the programming unit 10 in the initialization mode.

RAM 84 also stores identification code (machine ID) of the control apparatus that has supplied the application program, now residing in RAM 84. The stored or registered identification code is the machine ID of the control apparatus 50 in the case of the resistance welding system shown in FIG. 2. According to the system and application programs stored in ROM 82 and RAM 84, CPU 80 executes necessary computations, controls respective components of the programing unit 10 and communicates data with the control apparatus connected to the programming unit 10.

RAM 85 stores selected values of welding conditions, measured values, and intermediate and final computed data from CPU 80. The panel controller 88 provides an interface between CPU 80 and the front panel, supplies a key input signal from the keys 20 to 28 to CPU 80 and controls the display (liquid crystal display) 18 to display data from CPU 80.

The communication interface circuit 88 provides a communication interface for data communication with the main control 50, such as modem interface function for RS-232C or RS-422, for instance. The communication interface circuit includes a communication integrated circuit for transmitting and receiving, a driver/receiver, etc.

Figure 3:
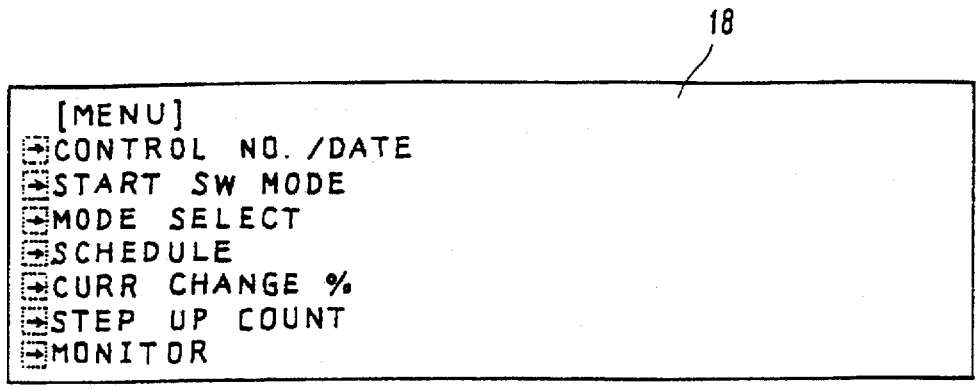
FIG. 3 is a view of a menu screen displayed on the programming unit.
Figure 4:
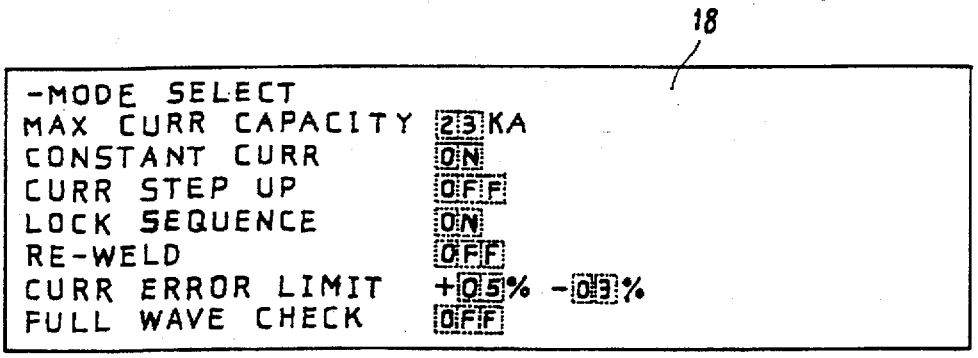
FIG. 4 is a view of a mode select screen displayed on the programming unit.
Figure 5:
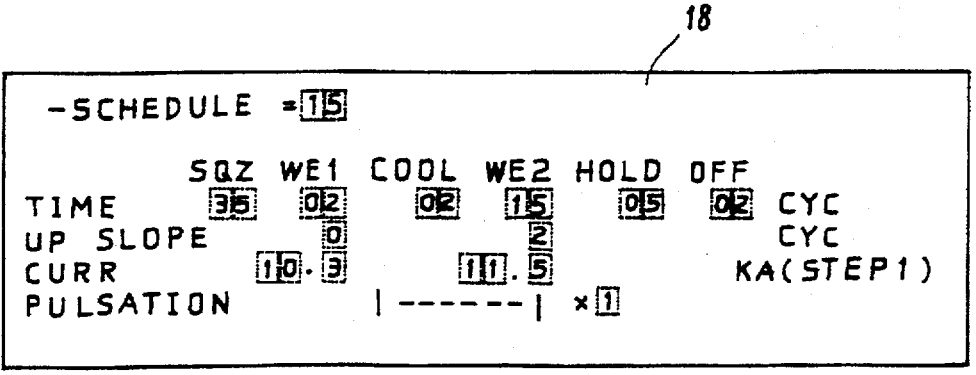
FIG. 5 is a view of a schedule screen displayed on the programming unit.

FIGS. 3 to 5 are views of a screen (visual presentation) displayed on the liquid crystal display panel 18 of the programing unit 10. When the menu key 26 is depressed, a menu screen shown in FIG. 3 is displayed.

The menu screen provides a list of available screens other than the menu screen. The cursor keys 20a to 20d are operated to move the screen cursor to point to a desired item, for example "mode select." Depressing the menu key 26 again causes the display panel 18 to display a mode select screen such as the one shown in FIG. 4.

The mode select screen is common to all welding schedules. That is, using the mode select screen, an operator sets those welding conditions or items which are common to all welding schedules. For example, the item of maximum current capacity "MAX CURR CAPACITY" is determined by the configuration of the welding machine involved. In FIG. 4, the maximum current capacity is set to 23 kA (kiloamperes), for instance. The numeric value of each item can be changed to a desired one by depressing increment or decrement key 22, 24, To this end, the operator moves the screen cursor to the selected value entry position of the item. Then, the operator repeatedly depresses either the increment key 22 to increment the displayed value or the decrement key 24 to decrement the value until the desired value has been reached. Certain items such as the constant-current control "CONSTANT CURR" and current step up "CURR STEP UP" are set to "ON" in response to depressing of the increment key 22 and set to "OFF" in response to depressing of the decrement key 24.

Selecting the item "SCHEDULE" from the menu screen shown in FIG. 3 will change visual presentation on the display panel 18 to a schedule screen shown in FIG. 5.

In the schedule screen, the operator may select and enter desired welding conditions for each welding schedule. First, a schedule No. is input to the first line of the schedule screen. Then, each welding condition item squeeze time (SQZ), first weld time (WE1), cool time (COOL), second weld time (WE2), hold time (HOLD), off time (OFF) is selected by positioning the screen cursor. The welding condition item is set to a desired value by operating increment or decrement key 22, 24.

When the increment or decrement key 22, 24 is depressed in the mode select or schedule screen, the programming unit 10 not only displays a value at the cursor position entered or updated by the key operation but also updates the selected value of the item stored in memory (RAM 85) to the one (newly selected data) displayed at the screen cursor position and sends the newly selected data to the resistance welding control apparatus 50 via the communication interface 88.

Upon receipt of selected data from the programming unit 10, the resistance welding control apparatus 50 updates the selected value of the item stored in memory (RAM 62) to the received data. In this manner, when the increment or decrement key 22, 24 is released, the value displayed at the screen cursor position is entered as newly selected value and stored in both the programming unit 10 and the resistance welding control apparatus 50.

Figure 6:
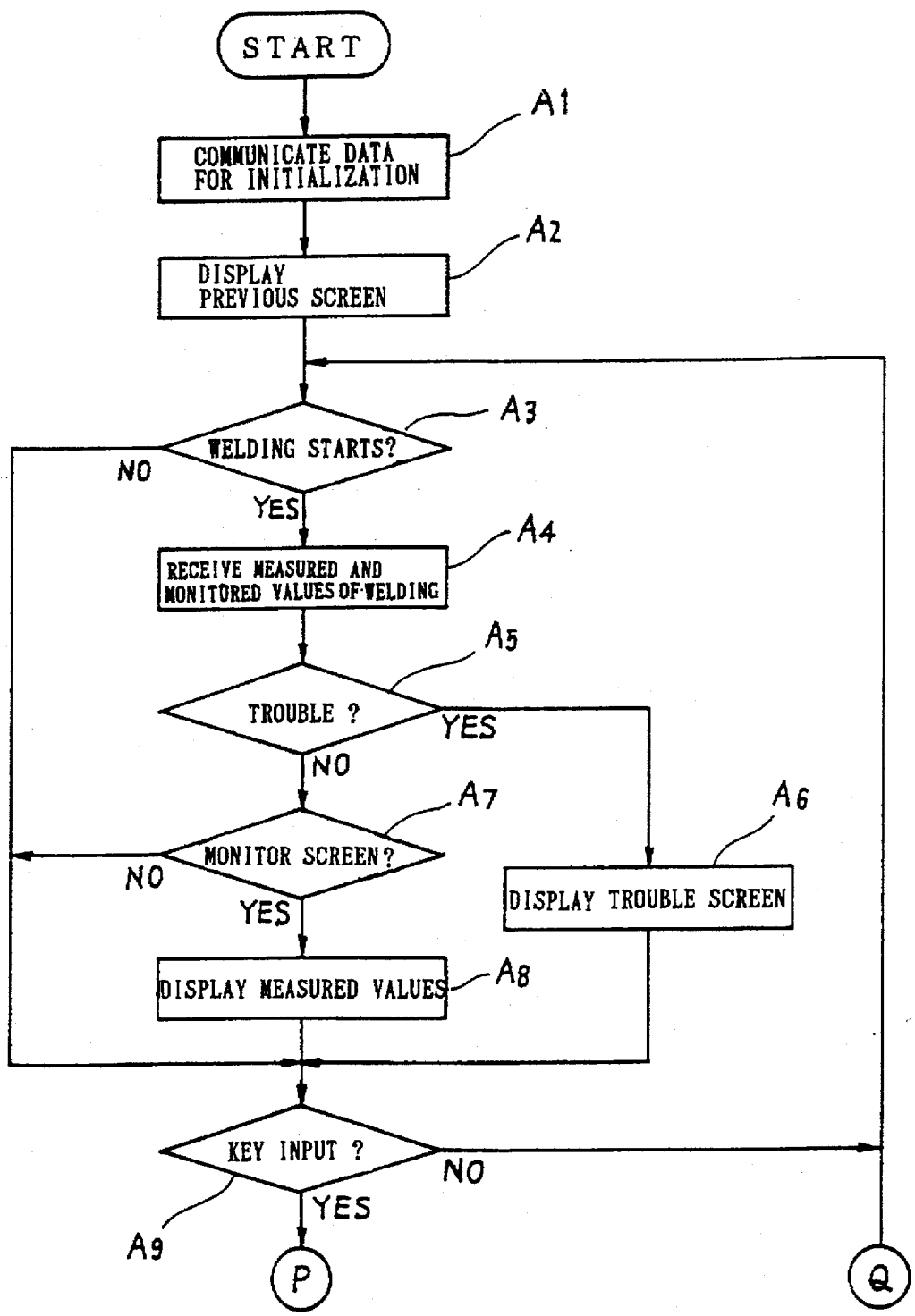
FIGS. 6 and 7 are flowcharts of an operation of CPU in the programming unit in accordance with the present invention.
Figure 7:
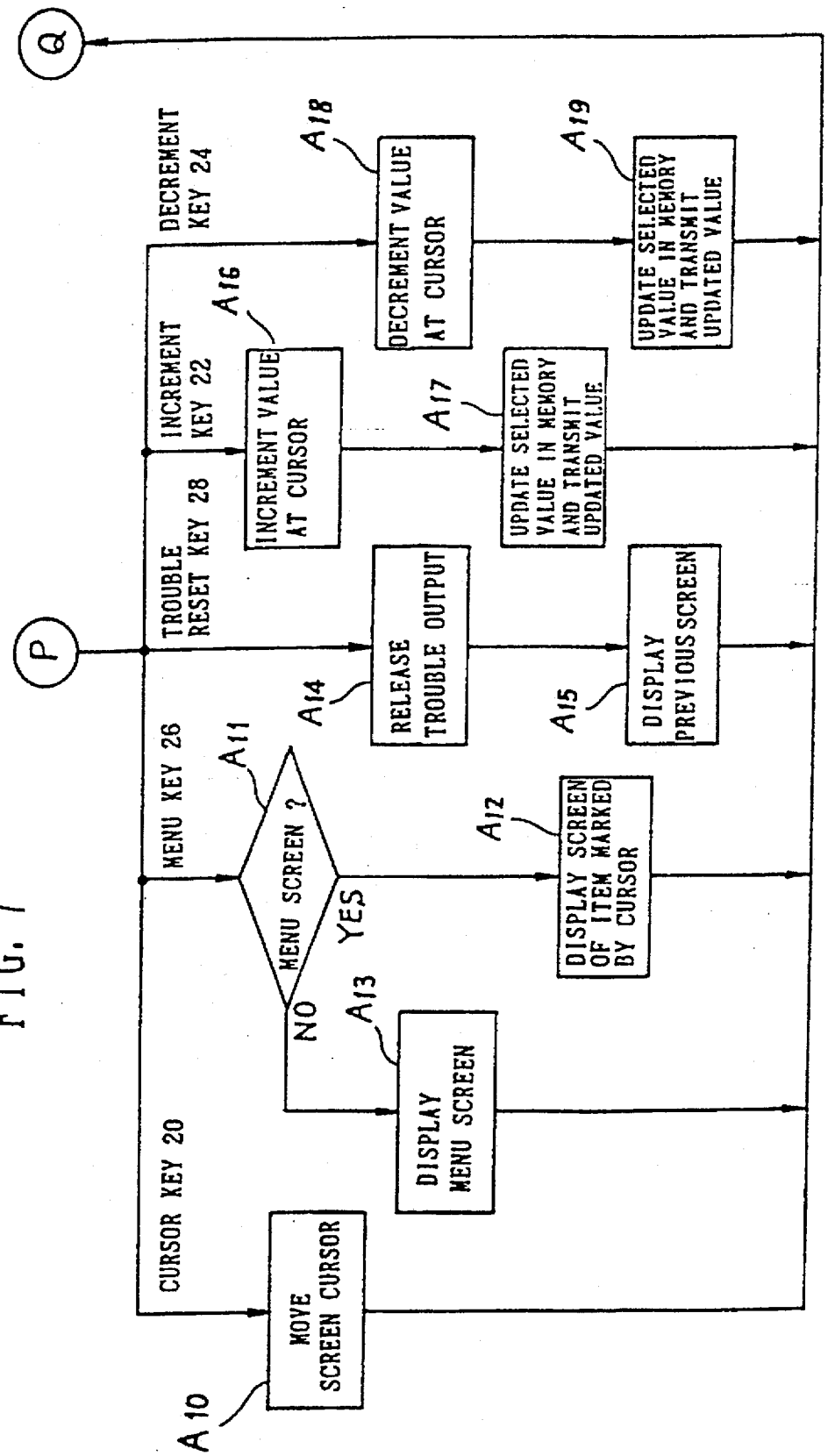
Figure 8:
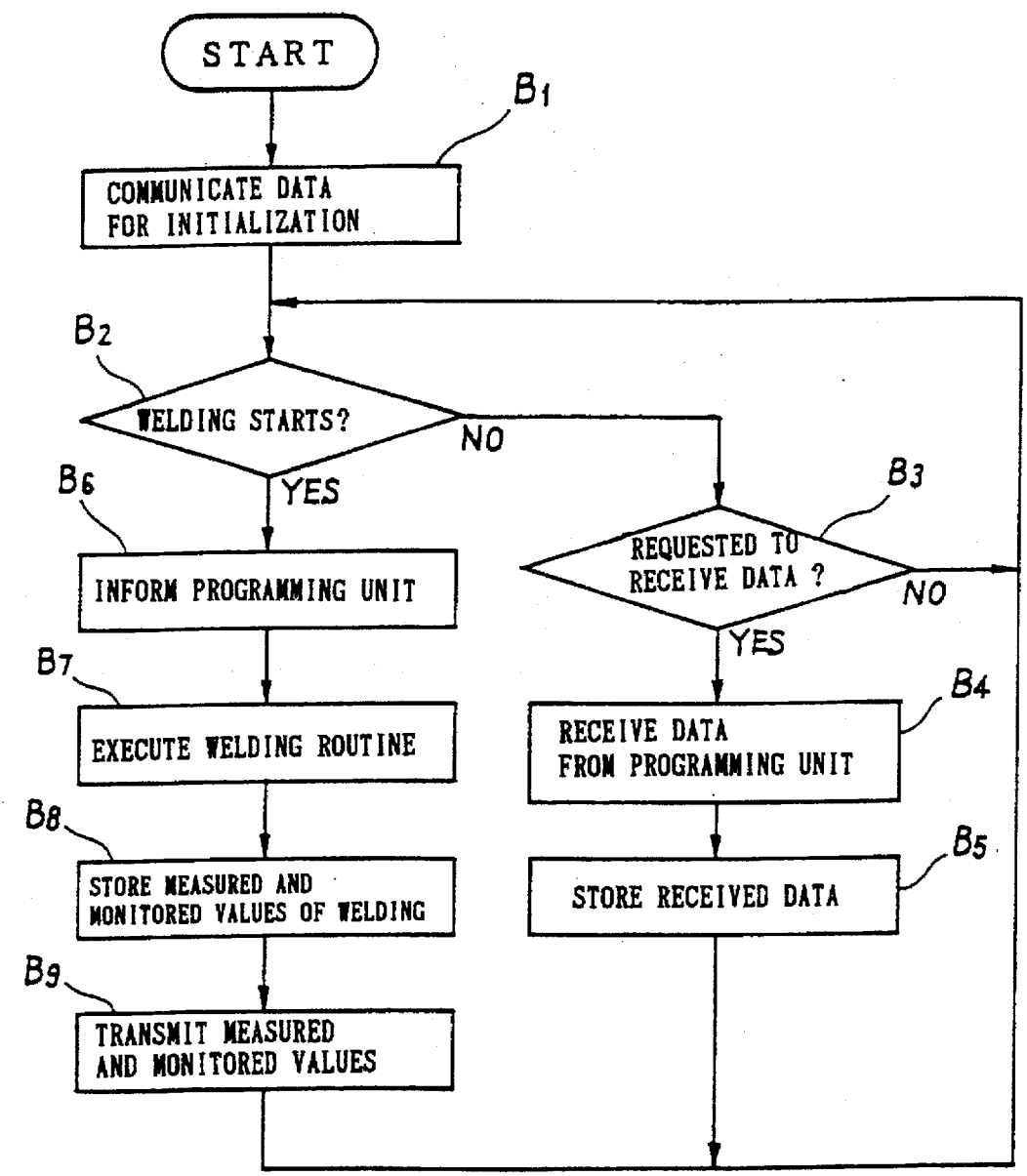
FIG. 8 is a flowchart of an operation of CPU in the resistance welding control apparatus in accordance with the present invention.

An overall operation of the present resistance welding system will be described with reference to FIGS. 6 to 8. FIGS. 6 and 7 are flowcharts of a main operation of CPU 80 in the programming unit. FIG. 8 is a flowchart of a main operation of CPU 58 in the resistance welding control apparatus 50.

Upon power on, the programming unit 10 and the resistance welding control apparatus 50 communicate data with each other for initialization (steps A1 and B1). This initial data communication is most pertinent to the present invention and will be described later in greater detail with reference to FIGS. 9 to 12.

In the initialization mode, the resistance welding control apparatus 50 also sends, via the interface circuits 72 and 88 and the communication cable 16, selected values (setup data) of the welding conditions (stored in RAM 62) to the programming unit 10. The programming unit 10 stores the received setup data into RAM 85.

Then, the programming unit 10 displays the previous screen, i.e., the one that was displayed at the last turning off the power (step A2) on the liquid crystal display panel 18.

Here an operator may enter selected values to the programming unit 10. The operator calls the schedule screen (FIG. 5) on the liquid crystal display panel 18 by operating the menu key 26 and the cursor keys 20 in the manner as described (steps A9–A13) if he or she wishes to updates some data, for instance, the value of the welding current for a particular welding schedule No.

The operator enters the particular welding schedule No. to the first line at the schedule No. entry position on the schedule screen. Then CPU 80 reads selected values of the welding conditions "SQZ", "WE1" etc., from RAM 85 and displays them on the schedule screen at their respective data entry positions. (This process is not shown in FIG. 7.)

Next, the operator depresses the cursor keys 20 to move the screen cursor to the data entry position of the welding current item "WE1" (step A10), and depresses the increment or decrement key 22, 24 (step A9). In response to the key input, CPU 80 of the programming unit 10 updates the value displayed at the data entry position of the item "WE1" (step A16 or A18), updates the stored value of the item "WE1" in RAM 85 and transmits the updated value of the item "WE1" to the resistance welding control apparatus 50 via the interface circuit 88 and the communication cable 16 (step A17 or A19).

Upon receipt of the updated value of the item "WE1", CPU 58 of the resistance welding control apparatus 50 stores it into RAM 62 at a predetermined storage location allocated to the item "WE1", thus updating the selected value of the item "WE1" (steps B3 to B5).

When a weld start signal ST has been received, by the interface circuit 72, from an external weld robot controller or weld start switch via the cable 74 (step B2), CPU 58 of the resistance welding control apparatus 50 communicates the signal ST to the programming unit 10 (step B6) and controls the resistance welding machine to perform resistance welding according to the welding conditions set up for the schedule No. specified by the weld start signal ST (step B7). CPU 58 stores into RAM 62 measured and monitored values of the resistance welding conditions (e.g., measured welding current data) obtained during the resistance welding operation (step B8) and transmits them to the programming unit 10 via the interface circuit 72 (step B9).

Turning to FIG. 8, CPU 80 of the programming unit 10 receives the weld start signal ST from the resistance welding control apparatus 50 (step A3). Afterwards it receives measured and monitored values, etc., of the present resistance welding operation from the resistance welding control apparatus 50 (step A4) and stores them into selected storage location of RAM 85.

When trouble, such as electrical disconnection or short-circuit of thyristors, has occurred during the resistance welding operation, CPU 80 of the pro, ramming unit 10 changes the visual presentation on the liquid crystal display panel 18 to a trouble screen including the trouble message (steps A5 and A6). In the case of a normal operation of the resistance welding, the measured and monitored values from the resistance welding control apparatus 50 will appear on a monitor screen on the display panel 18 (steps A7 and A8).

Among the processes by CPU 80 of the programming unit 10, discussed above with reference to FIGS. 6 and 7, the initial process A1 of communicate data for initialization is performed according to the system program stored in ROM 82 whereas the following processes A2–A19 are performed according to the application program stored in RAM 84 for the most pert thereof.

Figure 9:
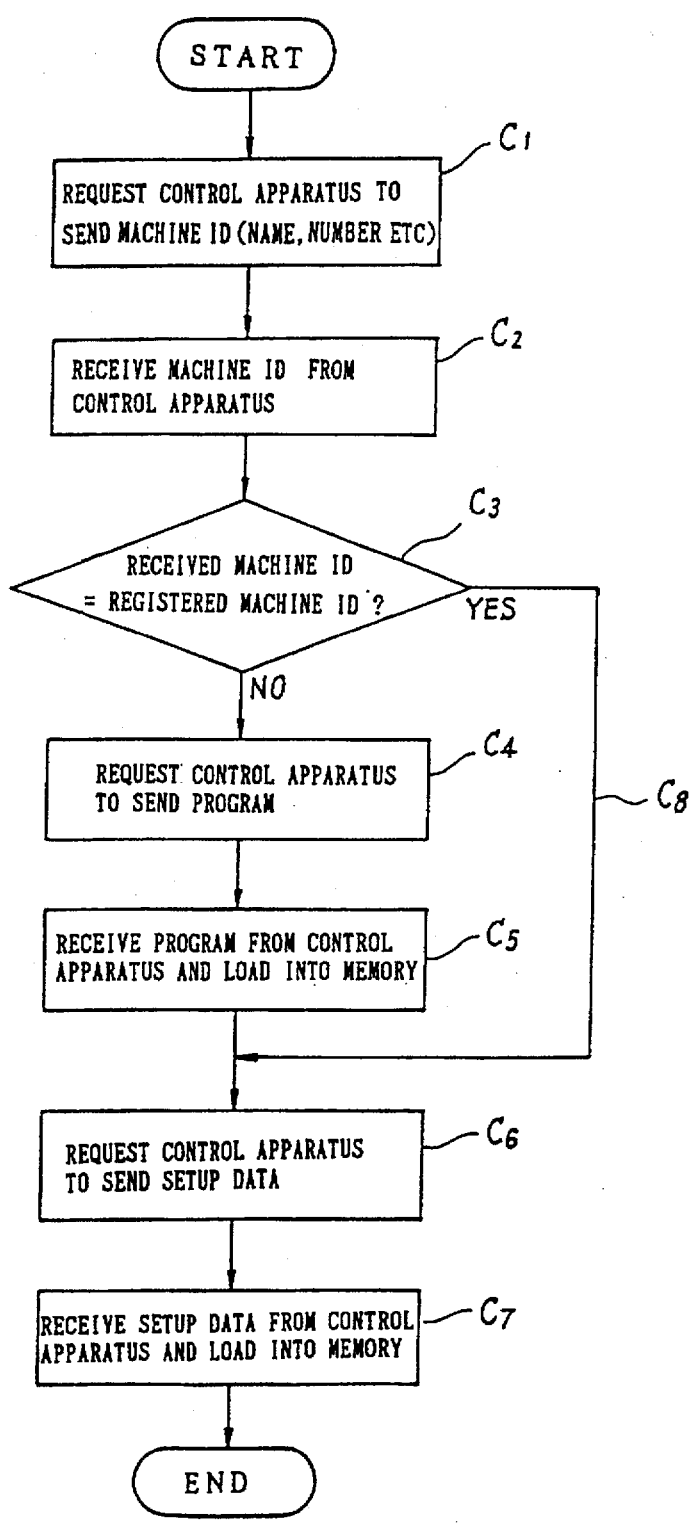
FIG. 9 is a flowchart of a data communication routine performed in an initialization mode between the programming unit and the control apparatus in accordance with the present invention.

The routine of communicating data for initialization will now be described with reference to FIGS. 9 to 12. FIG. 9 is a flowchart of the routine. FIG. 10 shows a sequence of data transmission performed in the initialization mode between the programming unit 10 and the resistance welding control apparatus 50. FIG. 11 shows contents or meaning of the data transmitted in the initialization mode. FIG. 12 shows a screen example displayed on the programming unit 10.

First (step C1), CPU 80 of the programming unit 10 inquires about the machine ID (name, No. etc. ) of the control apparatus 50 by sending an ID-inquiring central data a1 (??ID) to the control apparatus In response to the ID inquiry command, CPU 58 of the control apparatus 50 reads the machine ID thereof from ROM 60 and sends data b1 representing the machine ID (in FIGS. 10 and 11) to CPU 80 of the programming unit 10.

CPU 80 of the programming unit 10 receives the machine ID from the control apparatus 50 (step C2) and compares it with the machine ID registered in RAM 84 to see whether they match (step C3).

If not matched, it is judged that RAM 84 does not store any application program or that the application program currently stored in RAM 84 is different from the application program for programming unit stored in the resistance welding control apparatus 50 now connected to the programming unit 10. Thus CPU 80 of the programming unit 10 sends a predetermined control data a2. "??OP" (in FIGS. 10 and 11) to the control apparatus 50 to request the application program therein (step C4).

In response to the request from the programming unit 10, CPU 58 of the control apparatus 50 reads the application program from ROM 60 and sends the application program data 62 (in FIGS. 10 and 11) to CPU 80 of the programming unit 10. Thus CPU 80 of the programming unit 10 receives the application program data 62 from the control apparatus 50 and writes it into the program read/write memory (RAM 84) (step C5). CPU 80 also writes the machine ID of the control apparatus 50 into RAM 84, as newly registered machine ID.

As shown in part (4) in FIG. 11, part of the application program data b2 defines screens such as a schedule screen shown in FIG. 12. In part (4) in FIG. 11, ① specifies a screen No., ② and ③ specify line No. and column No., respectively, of the first display position of an item, ④ specifies a character string "-SCHEDULE=" of the item and ⑤ indicates a line feed command.

When it has received the application program (step C5), CPU 80 of the programming unit 10 sends the predetermined control data a3. "??QS" ( in FIGS. 10 and 11) to the control apparatus 50, thus requesting setup data (step C6). In response to the request, CPU 58 of the control apparatus 50 reads the setup data from RAM 62 and sends the data b3 (in FIGS. 10 and 11) to CPU 80 of the programming unit 10. Thus CPU 80 will receive the setup data b3 from the control apparatus 50 and write them into data memory, RAM 85 (step C7).

If the received machine ID matches the registered machine ID (step C3), CPU 80 of the programming unit 10 judges that the application program now resides in RAM 84 is the application program of the programming unit for the resistance welding control apparatus 50. Thus CPU 80 of the programming unit 10 receives, from the control apparatus 50, the setup data only without receiving the application program (steps C3, C6 and C7).

In this manner, CPU 80 of the programming unit 10 communicates with CPU 58 of the resistance welding control apparatus 50 via the communication interface in the initialization mode. Unless the application program dedicated to the control apparatus 50 has been recorded in the program memory (RAM 84) of the programming unit 10, the control apparatus 50 downloads that application program to the programming unit 10 via the communication interface. Afterwards CPU 80 of the programming unit 10 operates according to the application program downloaded from and dedicated to the control apparatus 50.

As is apparent from the foregoing, the single programming unit 10 is versatile and can adapt to various types of control apparatus with a common basic control program and communication interface.

Figure 13:
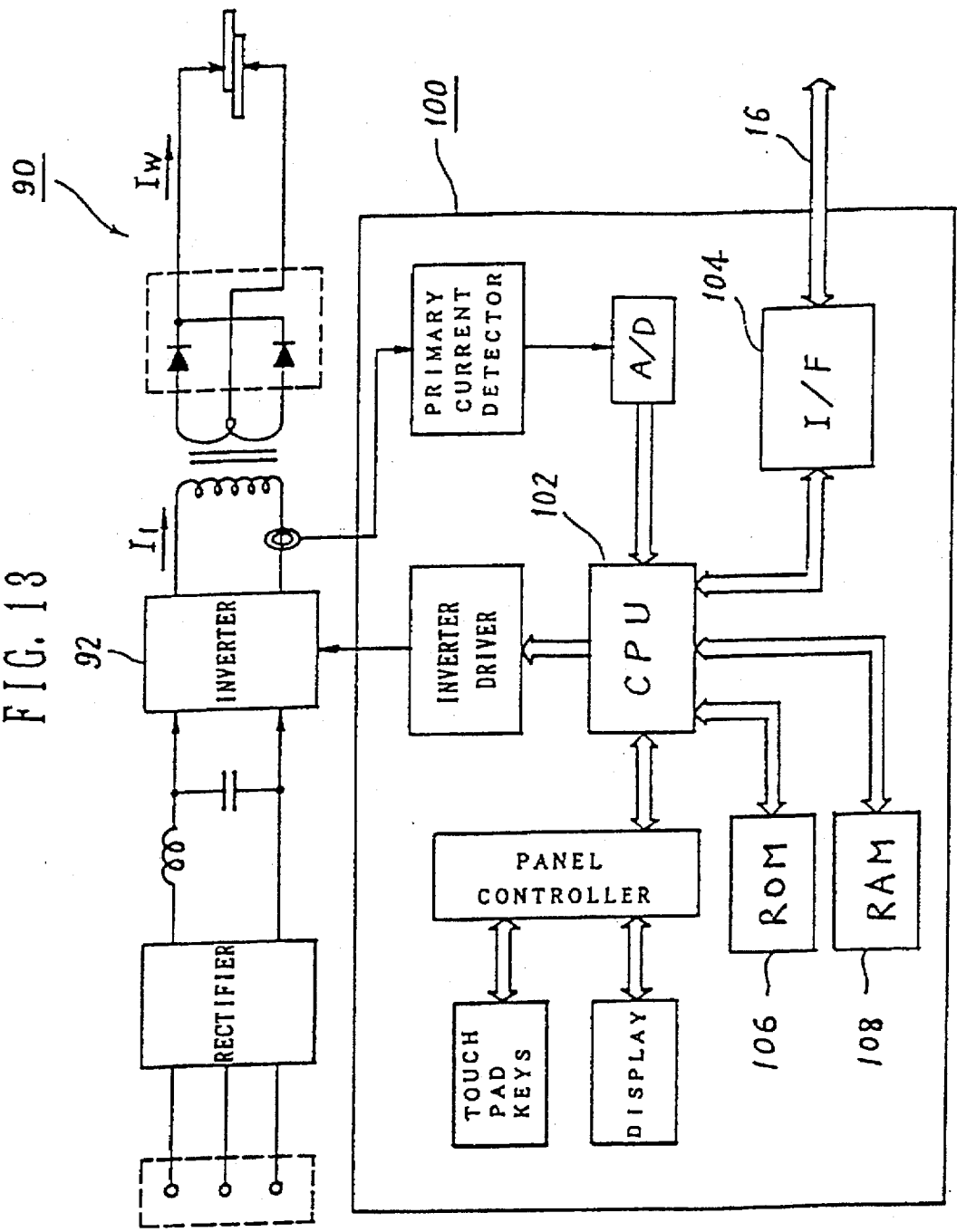
FIG. 13 is a block diagram of an inverter resistance welding system incorporating one embodiment of a resistance welding control apparatus in accordance with the present invention.

For instance, the programming unit 10 can adapt to an inverter resistance welding control apparatus, such as the control apparatus 100 shown in FIG. 13 by simply connecting thereto via the communication cable 16, thus connecting the communication interface circuit 104 in the resistance welding control apparatus 100 with the communication interface circuit 88 in the programming unit 10.

ROM 106 of the inverter resistance welding control apparatus 100 stores programs that define internal operation of the control apparatus, such as a control program for providing constant-current control of an inverter resistance welding, a display program, a key input routine, etc., for providing man-machine interface on the front panel. ROM 106 further stores a communication control program for communicating data with the programming unit 10. For adapting the programming unit 10 to the control apparatus 100, ROM 106 stores an application program which is dedicated to the control apparatus 100 and is to be downloaded into and used by the programming unit 10. In addition, ROM 106 stores an identification code (machine ID) of the control apparatus 100.

According to the programs stored in ROM 106, CPU performs required computations, controls respective components of the control apparatus 100, controls switching of the inverter circuit 92, communicates data with the programming unit 10 and so on. RAM 108 stores selected values (setup data) of welding conditions, measured values thereof, intermediate end final computed data from CPU 102, etc.

When the programming unit 10 is connected to the control apparatus 100 for controlling the inverter resistance welding machine 90, the programming unit 10 performs the initialization routine to communicate data with the control apparatus 100 for initialization in the sequence shown in FIGS. 9 and 10 (initialization mode).

In the initialization mode, if an application program dedicated to the AC resistance welding control apparatus 50 has been in the program memory (RAM 84) of the programming unit 10, then verifying the machine ID (step C3) will result in "not matched". Thus the control apparatus 100 downloads the dedicated application program into the program memory (RAM 84) of the programming unit 10 via communication interface, thus replacing the current application program for the control apparatus 50 with the one dedicated to the control apparatus 100 (steps C4 and C5). Also the machine ID registered in the programming unit 10 is replaced to the machine ID of the control apparatus 100 from the machine ID of the control apparatus 50. Now the programming unit 10 adapts to the inverter resistance welding control apparatus 100, thus capable of performing required functions of inputting setup data to the control apparatus 100 and displaying measured data therefrom.

Figure 14:
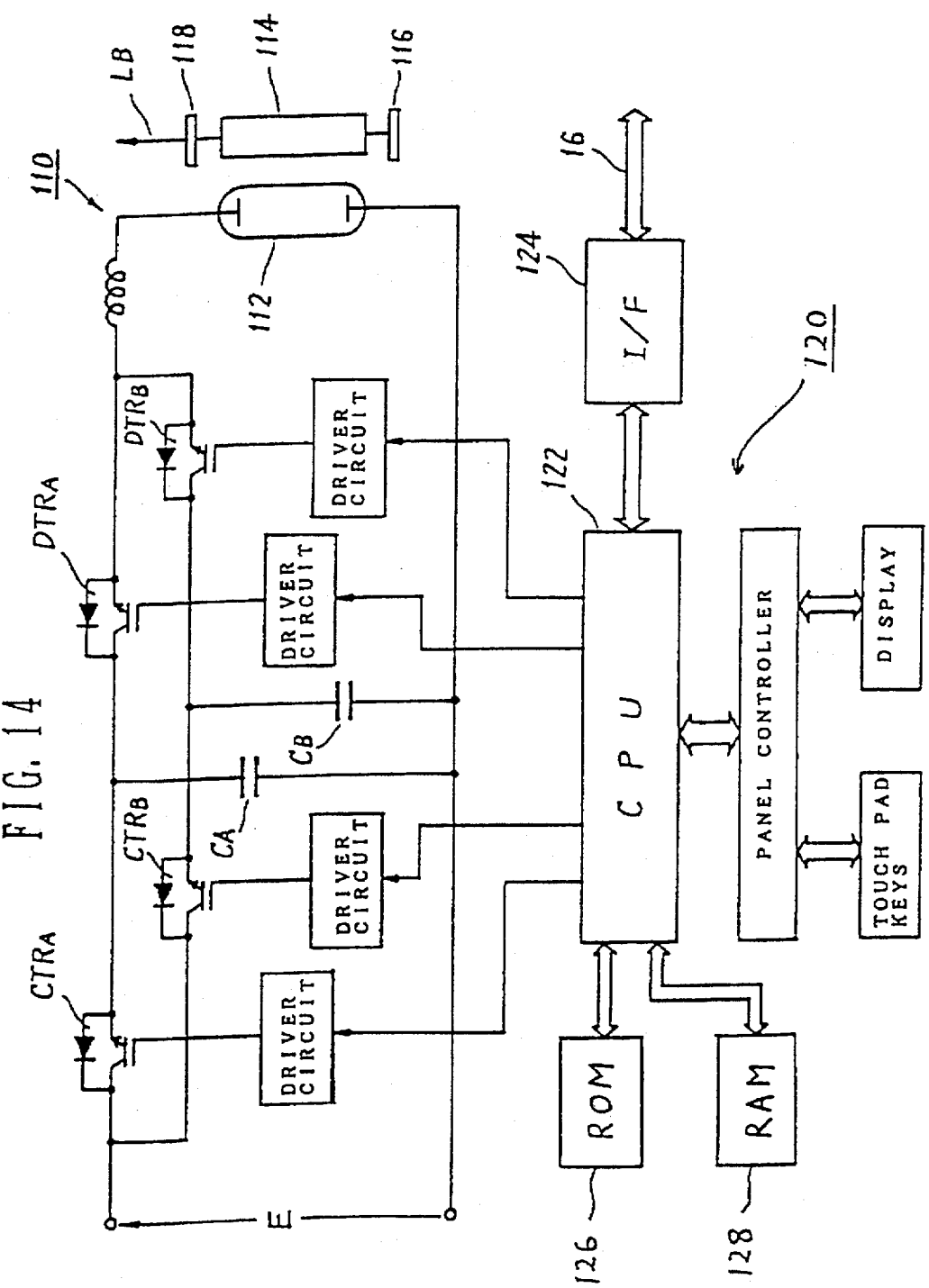
FIG. 14 is a block diagram of a YAG laser beam processing system incorporating an embodiment of a laser beam processing control apparatus in accordance with the present invention.

The programming unit 10 can also adapt to a control apparatus 120 for controlling a laser beam processing apparatus such as an yttrium-aluminum-garnet (YAG) laser beam processing apparatus 110 shown in FIG. 14 by simply connecting the communication interface circuit 88 in the programming unit 10 to a communication interface circuit 124 in the laser beam processing control apparatus 120 via the communication cable 16.

In an electric power supply of the YAG laser beam processing apparatus 110, a pair of capacitor banks $C_A$ and $C_B$ are connected in parallel to a laser excitation lamp 112. The capacitor banks $C_A$ and $C_B$ are independently charged and discharged at proper timings to supply the electric power to the laser excitation lamp 112. When supplied with the electric power, the laser excitation lamp 112 emits light to excite a YAG rod 114 by the energy of the light thereof. The light emitted from both end Sates of YAG rod 114 is amplified by an optical resonator of a total reflector mirror 116 and an output mirror 118 into a laser beam LB which is then output from the output mirror 118.

In the laser beam processing control apparatus 120, CPU 122 controls switching of charging transistors $CTR_A$ and $CTR_B$, and discharging transistors $DTR_A$ and $DTR_B$ according to programs stored in ROM 126 and welding condition setup data in RAM 128 to thereby control electric power supply to the laser excitation lamp 112 and therefore control the laser beam output.

ROM 128 stores a communication control program for data communication with the programming unit 10 and an application program deditated to the control apparatus 120 and to be downloaded into a programming unit for use therein. In addition, ROM 128 stores machine ID of the control apparatus 120.

When the programming unit 10 is connected to the control apparatus 120 for controlling the YAG laser beam processing apparatus 110, the programming unit 10 performs the initialization routine in the sequence shown in FIGS. 9 and 10. If the program memory (RAM 84) has an application program dedicated to, say, the inverter resistance control apparatus 100, the initialization routine replaces the stored application program in RAM 84 with the one dedicated to the YAG laser beam processing control apparatus 120. Also the machine ID of the control apparatus 120 is registered in the programming unit 10. Now the programming unit 10 adapts to the YAG laser beam processing control apparatus 120, thus capable of performing required functions of inputting setup data to the control apparatus 120 and displaying measured data therefrom.

Figures 15, 16:
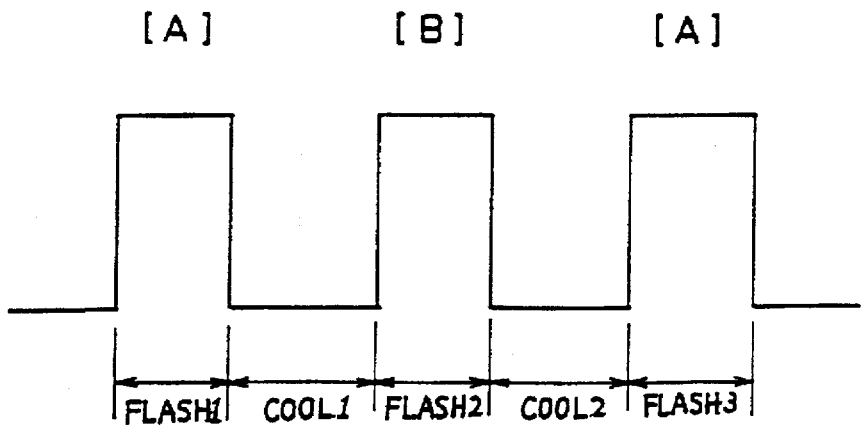
FIG. 15 is a view of a schedule screen displayed on the programming unit when used with the laser beam processing system in FIG. 14.
FIG. 16 is a waveform chart of an on/off state of a laser excitation lamp in which respective time intervals are set up in the schedule screen in FIG. 15.
Figure 17:
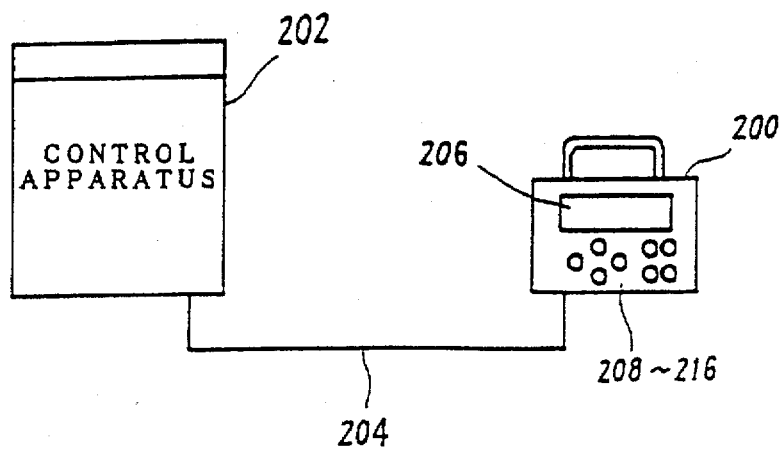
FIG. 17 is a diagram of a prior art resistance welding system.
Figure 18:
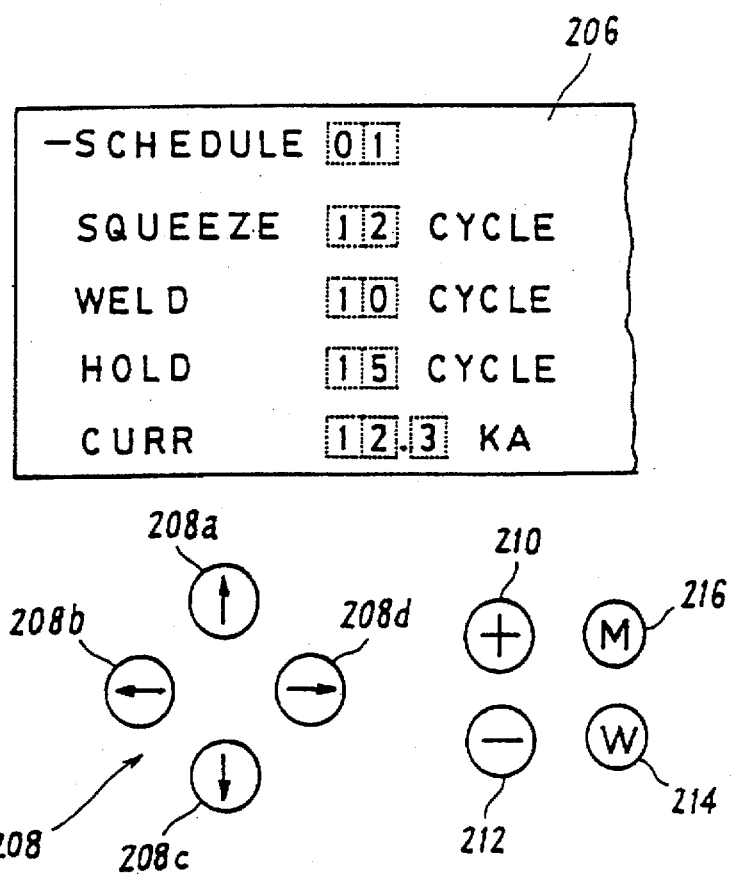
FIG. 18 is a partial view of a front panel of a prior art programming unit.
Figure 19:
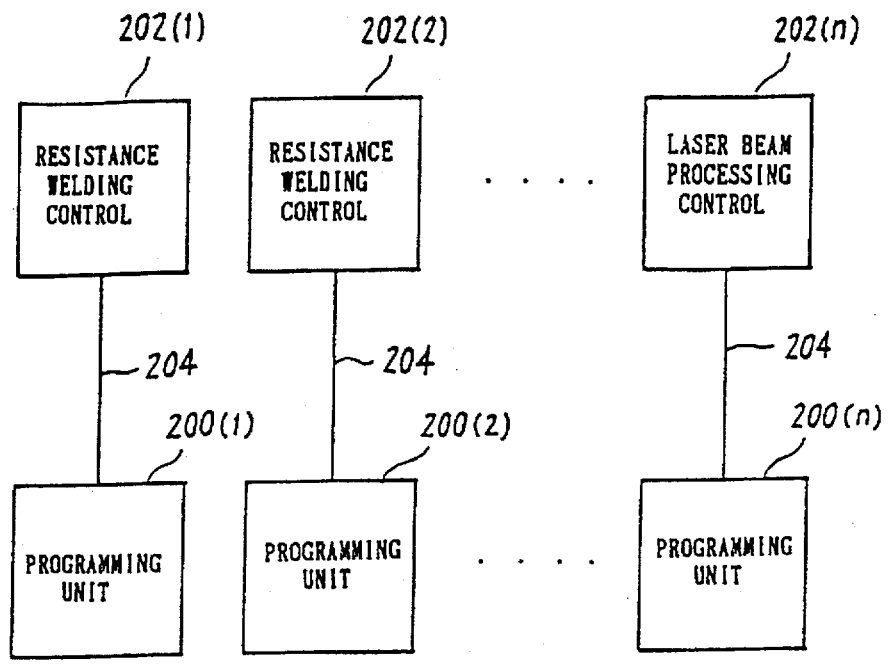
FIG. 19 is a diagram of a prior art configuration employing dedicated programming units connected to corresponding resistance welding control apparatus.
Figure 20:
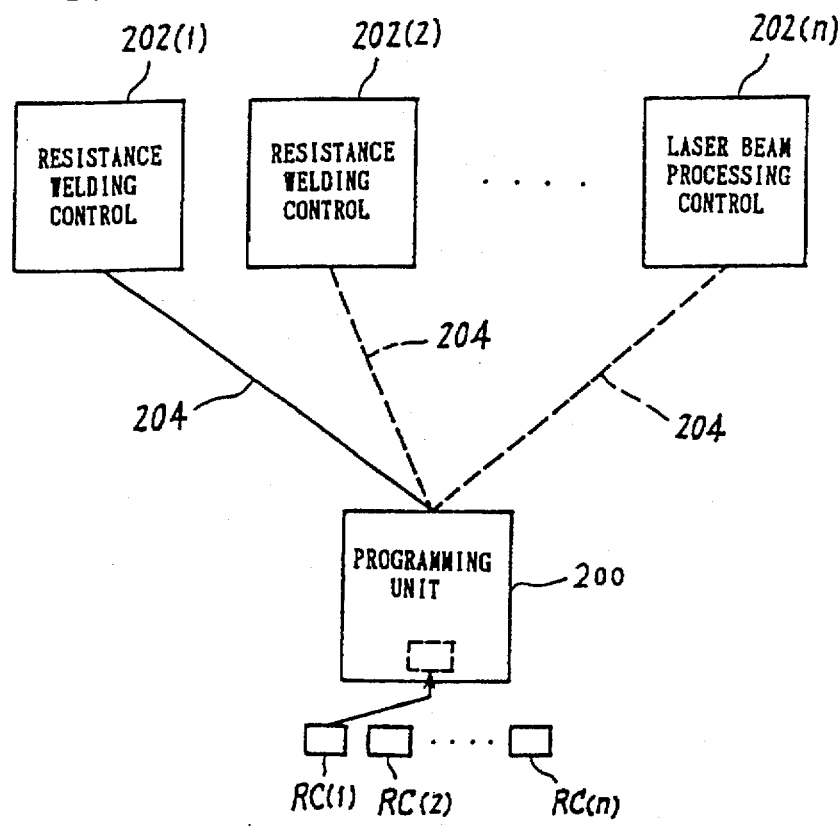
FIG. 20 is a diagram of a configuration employing a single programming unit which is loaded with selected one of ROM cards and shared by various types of resistance welding control apparatus.

FIG. 15 is a view of a schedule screen displayed on the programming unit 10, being connected to the YAG laser beam processing control apparatus 120. The schedule screen shown in FIG. 15 includes processing condition items together with their values for laser beam processing schedule No. 15. Among the processing condition item, items of "FLASH1" "COOL1" "FLASH2" "COOL2" and "FLASH3" correspond to respective time intervals of the excitation lamp on/off state time chart shown in FIG. 16.

"A" and "B" refer to capacitor banks $C_A$ and $C_B$, respectively. "A=500V" means that charged voltage across the capacitor bank $C_A$ has been set to 500 volts. Items "HI GH" and "LOW" refer to upper and lower limits of the laser output, respectively.

In the above embodiments, the initialization routine (FIG. 9) verifies the machine ID of the control apparatus currently connected and conditionally receives an application program from the control apparatus depending on the results of verification (C1 to C4). Verifying the machine ID (C1 to C3) may be omitted, however, and the application program may unconditionally be transmitted from the control apparatus to the programming unit 10.

Whereas in the above embodiments the programming unit 10 directly transmits selected data updated thereby to the control apparatus, it may be so modified as to convert or encode the selected data into any suitable format and transmit the converted or encoded data to the control apparatus. In the alternative, it may transmit a key signal entered from the increment or decrement key 22, 24. In this connection, the control apparatus may be modified so as to decode or re-convert the encoded or converted data from the programming unit or to process the received key signal into selected data for updating.

An enter key, such as the write key of the prior art programming unit 200, may be provided on the programming unit 10. After data is selected or updated by operating the data input key 22 or 24, the enter key is depressed to enter the selected data.

The above embodiments are directed to a programming unit for inputting selected values of welding or processing conditions to a resistance welding or laser beam processing control apparatus via a communication interface. The invention, however, can also be applied to a monitor unit for receiving and displaying measured and/or monitored values (e.g., measured welding current value) from such a control apparatus via a communication interface.

The key means in the terminal unit of the invention is not restricted to push-button keys 20, 22 and 24 of the above embodiment but may be implemented with any suitable input device. The display means is not restricted to a flat panel display but maybe implemented by, for instance, LED display devices. The information displayed by the display means includes any suitable visual information such as characters, graphics and so on.

In accordance with the present invention, an individual control apparatus for controlling resistance welding or laser beam processing transmits or downloads a dedicated application program to a terminal unit. The terminal unit performs functions dedicated to and required for the control apparatus. Therefore, the single terminal unit of the present invention can automatically adapt to various types of control apparatus without requiring any troublesome managing or handling on the part of an operator.

What is claimed is:

1. A method of operating a terminal unit which is connectable via a communication interface to a control apparatus for controlling a resistance welding operation, said method comprising:

establishing communication, in an initialization mode, between the terminal unit and the control apparatus by means of the communication interface;

downloading an application program, stored in the control apparatus, to the terminal unit;

storing said downloaded application in the terminal unit for execution of the application program by the terminal unit;

inputting, at the terminal unit, selected values of welding conditions to the control apparatus according to the application program stored in the terminal unit; and displaying, at the terminal unit, the selected values which were input at the terminal unit.

2. The method as claimed in claim 1, further comprising displaying, at the terminal unit, monitored values received from the control apparatus.

3. The method as claimed in claim 2 wherein the terminal unit comprises:

display means for displaying characters and/or graphics representative of the welding conditions;

key means for inputting the selected values of the welding conditions;

receiving means for receiving data from the control apparatus via the communication interface;

transmitting means for transmitting data to the control apparatus via the communication interface;

selected value read/write memory means for storing the selected values of the welding conditions;

program read/write memory means for storing the application program received by the receiving means;

program storage memory means for storing a system program for the terminal unit; and processing means for executing the system program stored in the program storage memory means to communicate with the control apparatus so as to receive the application program from the control apparatus and write the application program into the program read/write memory means in the initialization mode, and for executing the application program stored in the program read/write memory means to perform the input function and the display function.

4. The method as claimed in claim 2, wherein the control apparatus comprises:

selected value read/write memory means for storing the selected values of the welding conditions;

program storage memory means for storing a control program for the control apparatus and the application program for the terminal unit;

transmitting means for transmitting data to the terminal unit via the communication interface;

receiving means for receiving data from the terminal unit via the communication interface; and processing means for executing the control program stored in the program storage memory means to communicate with the terminal unit so that the application program is read out from the program storage memory means and sent to the terminal unit in the initialization, and to control the resistance welding operation.

5. A method of operating a terminal unit which is connectable via a communication interface to a control apparatus for controlling a laser beam processing operation, said method comprising:

establishing communication, in an initialization mode, between the terminal unit and the control apparatus by means of the communication interface;

downloading an application program, stored in the control apparatus, to the terminal unit;

storing said downloaded application program in the terminal unit for execution of the application program by the terminal unit;

inputting, at the terminal unit, selected values of laser beam processing conditions to the control apparatus according to the application program stored in the terminal unit; and displaying, at the terminal unit, the selected values which were input at the terminal unit.

6. The method as claimed in claim 5, further comprising displaying, at the terminal unit, monitored values received from the control apparatus.

7. The method as claimed in claim 5, wherein the terminal unit comprises:

display means for displaying characters and/or graphics representative of the laser beam processing conditions;

key means for inputting the selected values of the laser beam processing conditions;

receiving means for receiving data from the control apparatus via the communication interface;

transmitting means for transmitting data to the control apparatus via the communication interface;

selected value read/write memory means for storing the selected values of the conditions;

program read/write means for storing the application program received by the receiving means;

program storage memory means for storing a system program for the terminal unit; and processing means for executing the system program stored in the program storage memory means to communicate with the control apparatus so as to receive the application program from the control apparatus and write the application program into the program read/write memory means in the initialization mode, and for executing the application program stored in the program read/write memory means to perform the input function and the display function.

8. The method as claimed in claim 5, wherein the control apparatus comprises:

selected value read/write memory means for storing the selected values of the laser beam processing conditions;

program storage memory means for storing a control program for the control apparatus and the application program for the terminal unit;

transmitting means for transmitting data to the terminal unit via the communication interface;

receiving means for receiving data from the terminal unit via the communication interface; and processing means for executing the control program stored in the program storage memory means to communicate with the terminal unit so that the application program is read out from the program storage memory means and sent to the terminal unit in the initialization, and to control the laser beam processing operation.

* * * * *